(12) United States Patent
Cordier et al.

(10) Patent No.: US 7,269,353 B2
(45) Date of Patent: Sep. 11, 2007

(54) BRANCHING UNIT FOR AN OPTICAL TRANSMISSION SYSTEM

(75) Inventors: Alain Cordier, Vaul-le-Penil (FR); T Frish, Blackheath (GB)

(73) Assignee: Alcatel, Paris (FR)

( * ) Notice: Subject to any disclaimer, the term of this patent is extended or adjusted under 35 U.S.C. 154(b) by 612 days.

(21) Appl. No.: 10/234,124

(22) Filed: Sep. 5, 2002

(65) Prior Publication Data
US 2003/0048514 A1    Mar. 13, 2003

(30) Foreign Application Priority Data
Sep. 10, 2001  (GB)  .................... 0121811.4

(51) Int. Cl.
*H04B 10/12*    (2006.01)
(52) U.S. Cl. ..................................... 398/104
(58) Field of Classification Search ........ 398/104–105; 385/101; 361/109; 424/130.1, 178.1; 530/387.1
See application file for complete search history.

(56) References Cited

U.S. PATENT DOCUMENTS

| 4,641,372 | A | | 2/1987 | Jeal |
| 4,689,803 | A | * | 8/1987 | Johannessen et al. ........ 375/304 |
| 4,798,969 | A | * | 1/1989 | Inoue et al. ................. 307/112 |
| 5,196,984 | A | | 3/1993 | Webb |
| 5,214,312 | A | * | 5/1993 | Inoue .......................... 307/43 |
| 5,517,383 | A | | 5/1996 | Webb |
| 5,719,693 | A | | 2/1998 | Tanque |
| 5,779,162 | A | * | 7/1998 | Noakes et al. ........... 239/690.1 |
| 6,560,444 | B1 | * | 5/2003 | Imberg ........................ 455/78 |
| 6,627,196 | B1 | | 9/2003 | Baughman et al. ...... 424/138.1 |

FOREIGN PATENT DOCUMENTS

| EP | 0780994 A2 | 6/1997 |
| GB | 2147178 A | 5/1985 |
| JP | 2113735 | 4/1990 |
| JP | 9233004 | 9/1997 |

OTHER PUBLICATIONS

Negro et al., Recent Prog Horm Res. 59:1-12(2004), p. 2, lines 26-28.
Esteva, *The Oncologist* 9(Suppl 3):4-9 (2004), p. 6, column 1, lines 8-16.

* cited by examiner

*Primary Examiner*—Leslie Pascal
(74) *Attorney, Agent, or Firm*—Sughrue Mion, PLLC

(57) ABSTRACT

A branching unit for an optical transmission system, an optical transmission system and a method of operation of said branching unit (30) is disclosed having a first branch (38) and a second branch (40), each connected to a main branch (42). First directional current flow means (54) and second directional current flow means (58) are operable to allow electrical current to flow substantially in one direction only along the first branch (38) and the second branch (40) respectively such that electrical current flow from the first branch to the second branch and from the second branch to the first branch is substantially prevented and a simultaneous conduction of current between the first branch and the main branch and between the second branch and the main branch is prevented.

22 Claims, 4 Drawing Sheets

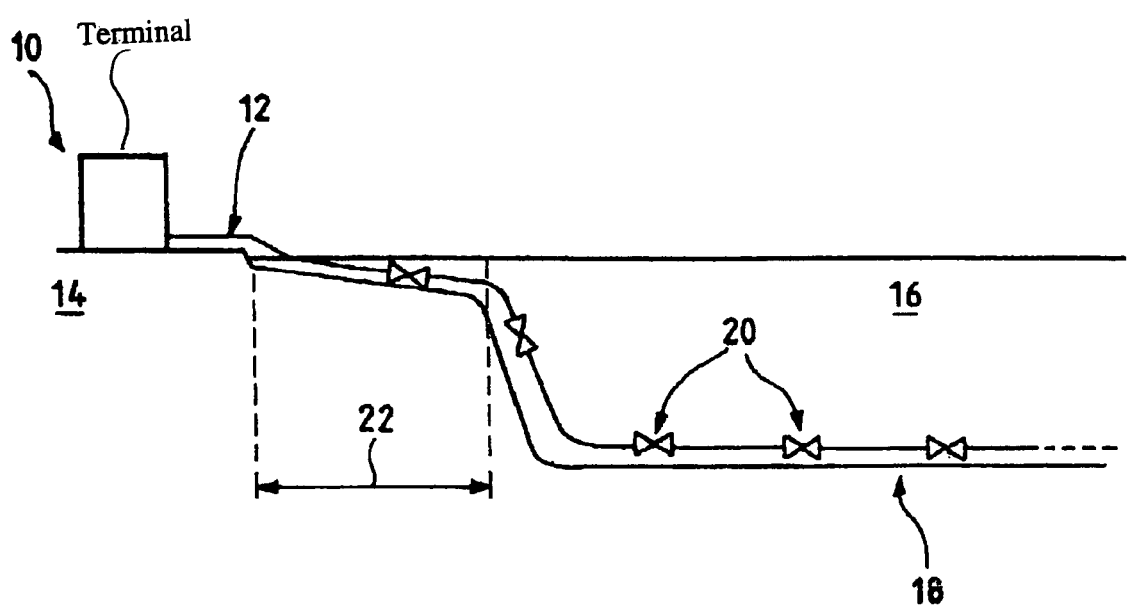
FIG_1

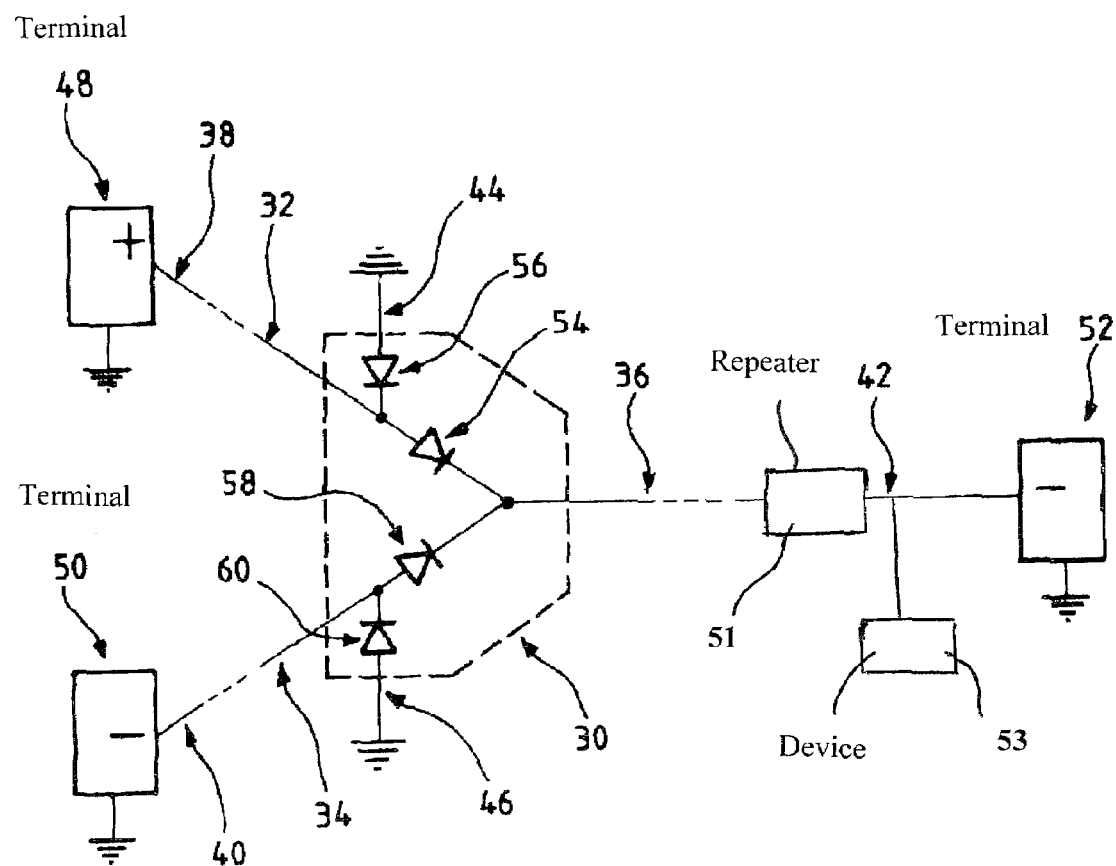

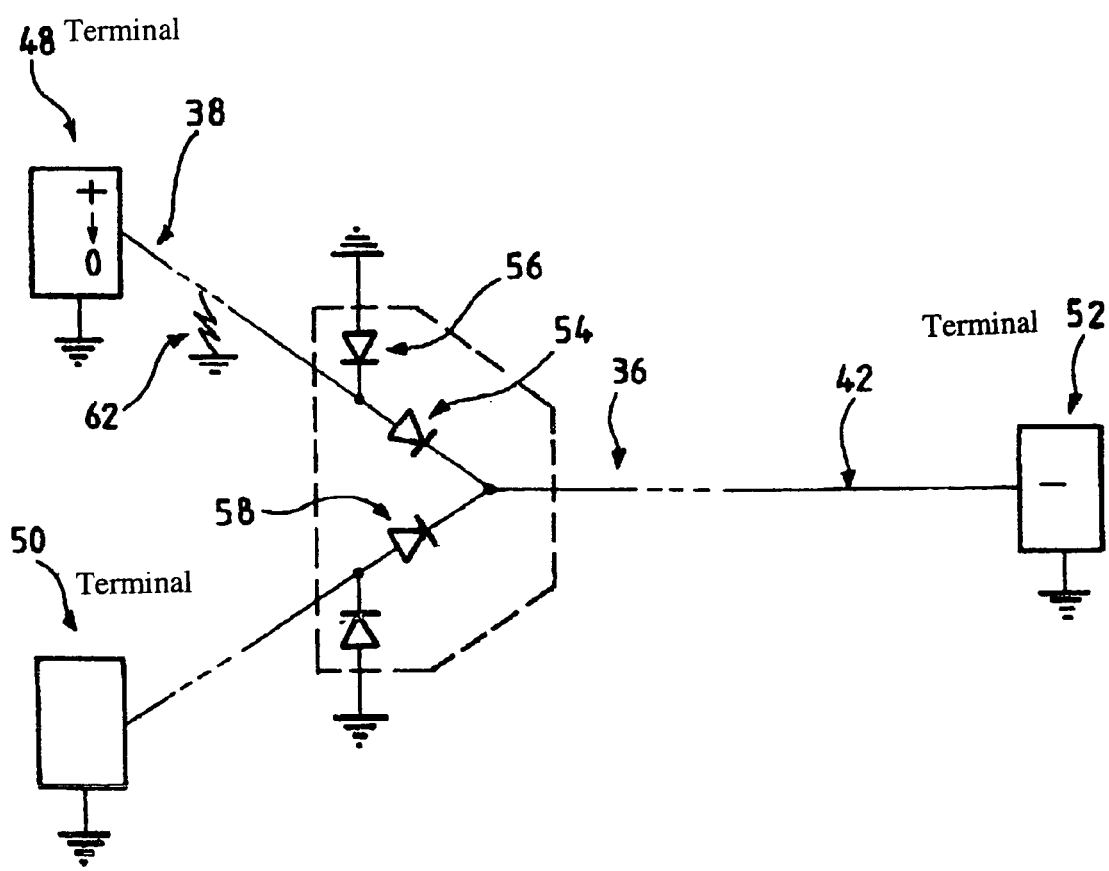
FIG_3

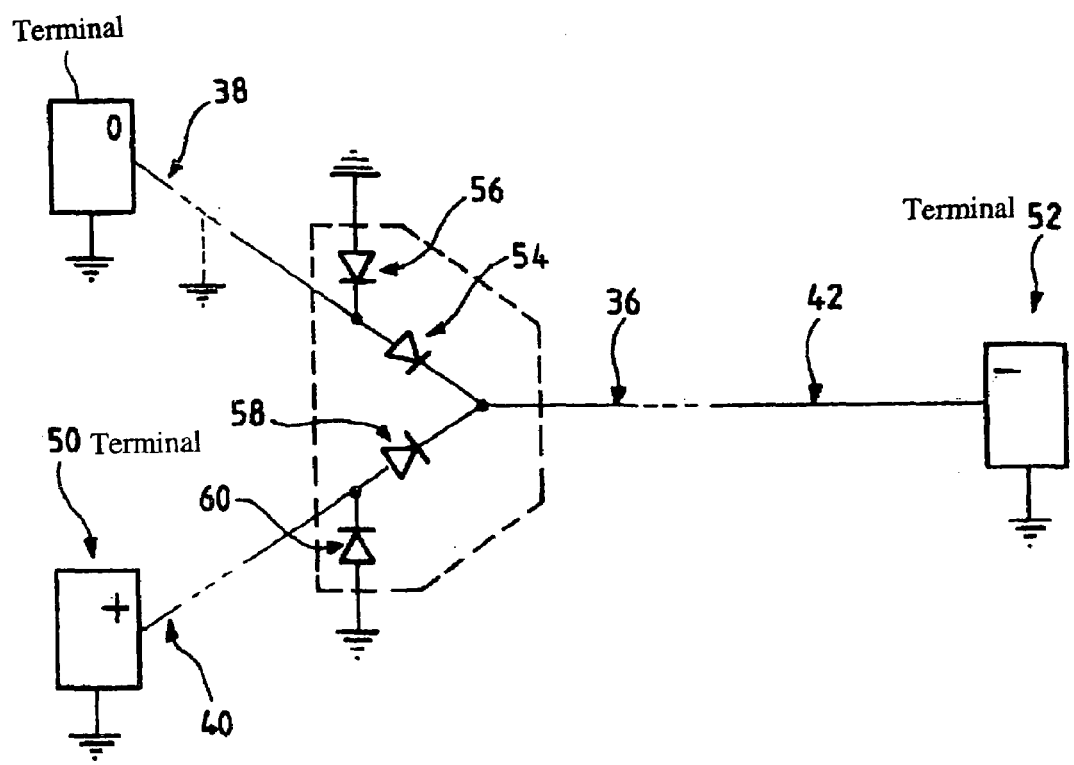
FIG_4

BRANCHING UNIT FOR AN OPTICAL TRANSMISSION SYSTEM

BACKGROUND OF THE INVENTION

The present invention relates to a branching unit for an optical transmission system. More particularly, the invention relates to apparatus for supplying such a system and branching unit with electrical power and a method of operation for that apparatus.

Optical transmission systems are utilised for sending data from one location to another. Typically, they utilise optical fibres for carrying a modulated light signal, the modulation being controlled according to the data being transmitted.

Such transmission systems can have high capacity and so are attractive for high volume communications systems. For this reason, amongst others, they are used for long distance communication systems, for example in submarine communications systems. Periodic amplification of the light signals is usually carried out using repeaters which require an electrical power feed.

In addition to repeaters, there are other devices in the optical transmission system which require electrical power. These include detectors for indicating the status of different parts of the system, such as different lengths of transmission line and branching units.

To supply power to the system, it is necessary to have an electrical conducting path along with the optical fibres. Usually, the conducting path is provided as a metallic sheath conductor around the bundle of optical fibres.

In order to provide a power supply of the desired magnitude, typically at a terminal of the transmission line, a power feed apparatus is used to hold the terminal at a particular voltage to feed power to the conductor. Typically, at the other terminal, a voltage of opposite polarity is applied.

In order to increase the reliability of a submarine optical transmission system, branching units are sometimes used. These allow a main, e.g. intercontinental, transmission cable to be connected to two landing transmission cables. In shallow waters and nearer land, damage to the transmission cables from trawlers, etc, is more likely than in deep water. Therefore two landing cables are used to increase the redundancy of the system. A failure or fault in one landing cable can be repaired whilst the data signals are routed along the other cable to and from the main cable.

Electrical current for powering electrical devices associated with the optical transmission system is conductable between a first branch of the branching unit and a main branch and between a second branch and the main branch.

In order to avoid overloading the conductor of the main cable, power is fed to the main cable from only one of the landing cables. However, in the event that a fault develops in that landing cable, it is necessary to de-power the system in order to repair the fault due to the high voltage nature of the power feed. This can result in a lengthy period of time in which the system is not operative, which is not desirable. In order to use the second landing cable to power the system, it is necessary to disconnect the first landing cable (for example at the branching unit) in order to avoid the power feed from the second landing cable flowing to e.g. an earth fault in the first landing cable. Such disconnection is clearly time-consuming and difficult if the branching unit is under water.

SUMMARY OF THE INVENTION

Accordingly, in a first aspect, the present invention provides a branching unit for an optical transmission system, the branching unit having a first branch and a second branch, each connected to a main branch, first directional current flow means operable to allow electrical current to flow substantially in one direction only along the first branch, second directional current flow means operable to allow electrical current to flow substantially in one direction only along the second branch, whereby, in use, electrical current flow from the first branch to the second branch and from the second branch to the first branch is substantially prevented. In this way, the first and second directional current flow means may operate as electrical valves so that, in the event of a fault in a landing cable connected to the branching unit, electrical power may be supplied to the main branch from the alternative branch without the current proceeding back along the other branch, away from the main branch.

A diode is an example of a directional current flow means. More generally, such a means may, for example, be a device which allows substantial electrical current flow through it in one direction but allows substantially no electrical current flow through it in the reverse direction.

Preferably, electrical power may be supplied to or from the main branch to or from the first branch or to or from the second branch, as appropriate.

Preferably, the first branch is connectable to a first optical transmission cable at a first branch connection point and the second branch is preferably connectable to a second optical transmission cable at a second branch connection point.

Preferably, the first directional current flow means is located between the main branch and the first branch connection point. Similarly, the second directional current flow means is preferably located between the main branch and the second branch connection point.

Preferably, a first earth connection point is provided to the first branch between the first branch connection point and the first directional current flow means. More preferably, the first earth connection point is connected to the first branch via a directional current flow means, directed so as to allow, in use, a current flow between the first branch and earth substantially in one direction only.

Preferably, a second earth connection point is provided to the second branch between the second branch connection point and the second directional current flow means. More preferably, the second earth connection point is connected to the second branch via a directional current flow means, directed so as to allow, in use, a current flow between the second branch and earth substantially in one direction only.

Typically, the branching unit includes detection means for detecting a fault in the branching unit. Additionally or alternatively, the branching unit includes detection means for detecting a fault in a cable attached to the branching unit.

Typically, the branching unit is a submarine branching unit.

Preferably, one or more of the directional current flow means is a solid state device. More preferably, one or more of the directional current flow means is a diode. Even more preferably, one or more of the directional current flow means has a reverse bias breakdown voltage of more than 1 kV. The breakdown voltage could be higher, perhaps as high as 20 KV.

In a second aspect, the present invention provides an optical transmission system having a branching unit according to the first aspect and further including a first optical transmission cable connected to the first branch, a second optical transmission cable connected to the second branch and a main optical transmission cable connected to the main branch, and power feed apparatus connectable to the cables for powering electrical devices attached to the cables.

Preferably, the power feed apparatus connectable to the second optical transmission cable is switchable from one voltage to another in response to the detection of a fault in the first optical transmission cable, in order to supply the main cable with electrical power.

In a third aspect, the present invention provides a method of operation of a branching unit according to the first aspect, the branching unit having a normal mode of operation and a fault mode of operation, wherein in the normal mode:

the first branch is held at a first voltage, a current flows through the first directional current flow means due to a potential difference between the first branch and the main branch, and in the fault mode:

the second branch has a second voltage applied to it so that there is a potential difference between the second branch and the main branch, the potential difference having a direction such that a current flows through the second directional current flow means; and due to the potential applied to the second branch, the potential difference across the first directional current flow means is in the opposite direction to that required for substantial current to flow through the first directional current flow means so that substantially no current flows between the main branch and the first branch, whereby in the fault mode substantially all of the current in the main branch flows along the second branch and not along the first branch.

Thus, the branching unit may be operable to allow the power feed for the main branch to be supplied via the second branch in the event that a fault develops in the first branch. Of course, if in normal operation the power is fed to the main branch via the second branch, then the branching unit could allow power to be fed to the main branch from the first branch in the event that a fault develops in the second branch.

Preferably, in the normal mode of operation, the second branch is held at a voltage such that an electrical current flows between the second branch and an earth connection at the branching unit, thereby powering electrical devices connected to the second branch.

Preferably the method includes the step of detecting an occurrence of a fault in the first or second branch. Typically, the fault is an earth fault, but the invention is applicable to other types of fault, e.g. cable breaks.

Preferably, the method further includes the step of removing the earth fault from the first branch and subsequently applying a voltage to the first branch such that an electrical current flows between the first branch and an earth connection at the branching unit, thereby powering electrical devices connected to the first branch.

Preferably optical data signals are routed through the branching unit such that the data signals travel along the first branch or the second branch, depending on which is powered.

BRIEF DESCRIPTION OF THE DRAWINGS

Preferred embodiments of the invention will now be described, by way of example only, with reference to the accompanying drawings, in which:

FIG. 1 shows a schematic representation of a submarine optical transmission system and its land-based terminal.

FIG. 2 shows a schematic representation of a branching unit according to an embodiment of the invention in normal operation in an optical transmission system.

FIG. 3 shows a schematic representation of the branching unit of FIG. 2 in the event of an earthing fault in the first branch cable.

FIG. 4 shows a schematic representation of the branching unit of FIG. 2 when the power feed is reversed.

DETAILED DESCRIPTION OF THE INVENTION

FIG. 1 shows a schematic representation of a submarine optical transmission system and its land-based terminal. Terminal 10 provides optical signal input and power feed for optical transmission cable 12. Terminal 10 is based on land 14. Cable 12 is laid from the land to the sea 16, lying on the sea floor 18. Cable 12 has repeaters 20 for repeating the optical signal down the cable. Repeaters 20 require a power feed, provided by connecting a conducting sheath of the cable to the power feed at the terminal 10.

Damage to the cable in deep water is not likely. However, the cable can be damaged in shallow water 22, for example by trawlers or anchors. For this reason, dual landing cables are often used for connecting a main optical transmission cable (in deep water) to two landing cables. A branching unit is used to make the connection. Since it is unlikely that both landing (branch) cables will be damaged or develop a fault at the same time, this provision provides the system with some redundancy.

An embodiment of the invention is illustrated in FIG. 2. In FIG. 2, the branching unit 30 has three main electrical terminals, or connection points. These are the first branch terminal 32 (first branch connection point), the second branch terminal 34 (second branch connection point) and the main branch terminal 36 (Main branch connection point). In use, these connect the branching unit 30 to the first branch cable (or first landing cable) 38, the second branch cable (or second landing cable) 40 and the main cable 42, respectively. The branching unit also has a first earth terminal 44 and second earth terminal 46. The dotted lines in the cables represent distance. Typically, the branching unit 30 will be closer (by a factor of around 10, typically) to the terminals 48, 50 than to the main terminal 52, which may be on a different continent to terminals 48, 50. In normal operation, first terminal 48 will supply a positive DC voltage of around 8 kv, in this example. Main terminal 52 will supply a negative DC voltage of around −8 kV, giving a potential difference between terminals 48 and 50 of around 16 kV. Such large voltages are necessary due to the resistance of the cable conductor and due to the voltage dropped across each device supplied with power (e.g. the repeaters spaced around 50 kilometres apart). Of course, the invention may still operate if different voltages are used.

The power feed apparatus supplies around 1 A at this voltage, the onus being on maintaining a constant current as far as possible due to the constant current requirements of the repeaters 51 and other devices 53 along the cables for optimum system performance.

Due to the sheer length of the main cable 42 and assuming an approximately linear drop in voltage along the system with distance from terminal 42, the part of the system at zero volts (0V) will lie somewhere along cable 42. Therefore, during normal operation, terminal 36 will have a positive voltage, typically of several kV.

The branching unit 30 has four diodes 54, 56, 58, 60 Alternatively, any switching devices could be used, preferably ones which operate automatically, e.g. require no separate control signal. One is the first branch diode 54. In normal operation, this is forward biased and allows current to pass from first branch cable 38 to the main branch terminal 36 and onto the main cable 42. First earthing diode 56 is reverse biased and so no current flows to or from earth here. Thus, power is supplied to the main cable 42 via terminal 48.

A lower limit for their reverse bias breakdown voltage might be 1 kV, but preferably 10 kV.

In normal operation, terminal 50 is held at −8 kV. Second branch diode 58 is therefore reverse biased and so no current flows through this diode. Therefore, no current is supplied to main cable 42 via diode 58. This helps to avoid overloading cable 42. Since it is desirable to supply power to repeaters and other devices located on second branch cable 40, current is allowed to flow from earth, through forward biased earthing diode 60 to the power feed terminal 50. This does not affect the power feed of the main cable due to the isolation effect of reverse biased diode 58.

FIG. 3 shows a schematic representation of the same branching unit and optical transmission system as shown in FIG. 2, but this time with an earthing fault 62 developed in first branch cable 38. This fault (e.g. due to an exposed conductor in the cable) can create molecular hydrogen which is damaging to optical fibres. Accordingly, it is important to prevent current flow across and from the fault as soon as possible. Once the fault is detected, the voltage of terminal 48 must be reduced to zero to stop the current flow. Of course, the invention can address faults other than earth faults, but an earth fault is used as an example here.

Due to the reduction in potential of terminal 48, main branch terminal 36 is now slightly negative, by virtue of main terminal 52. Therefore, diodes 54 and 56 are forward biased and so some current will flow from earth at earth terminal 44 along main cable 42. Second branch diode 58 is still reverse biased, and so substantially no current flows through this diode.

In order to restore a full power feed to main cable 42, the voltage of terminal 50 must be reversed from negative to positive. The effects of this are indicated in FIG. 4.

In FIG. 4, power feed 50 is now at a voltage of around +8 kV. Therefore, second earthing diode 60 is now reverse biased and substantially no current flows through diode 60.

Second branch diode 58 is now forward biased and, due to the relatively small voltage drop across it, main branch terminal 36 is now positive. Current flows along second branch cable 40, through second branch diode 58 and along main cable 42 to main terminal 52.

Since main branch terminal 36 is now positive, diodes 54 and 56 are now reverse biased. Therefore substantially no current flows through these diodes. Substantially all the power feed for main cable 42 comes from power feed 50.

The data signals can be routed along main cable 42 and second branch cable 40. The fault in cable 38 can be repaired without interfering with the data flow along the optical transmission system.

A diode is an example of a directional current flow means. More generally, such a means may, for example, be a device which allows substantial electrical current flow through it in one direction but allows substantially no electrical current flow through it in the reverse direction.

The advantage of using diodes instead of, for example, switches such as relays is that diode switching in a high voltage system results in much smaller electrical stress in the system than relay switching. In addition, the switching of the power routing is in a sense automatic using diodes once the plurality of the second power feed 50 is reversed. In contrast, relay switching requires a switch command to be sent to each relay to be switched. Such a system is more complex than the diode system explained here, with more hardware to maintain and/or risk of failure.

Due to its length, main cable 42 has a "virtual earth" located somewhere along its length. This provides redundancy in the event that power feed terminal 52 shuts down or when a shunt fault occurs along the main cable 42.

Of course, there is no bar to the use of a similar branching unit at the other end of main cable 42. In that case, the main cable 42 would branch into two branch cables via a similar branching unit to branching unit 30. In that branching unit, the diodes would need to be reversed for the unit to function normally, with a positive earth electrode at that branching unit.

Embodiments of the present invention have been described by way of example only. Modifications of the embodiments described, further embodiments and modifications thereof will be obvious to the person skilled in the art and as such are within the scope of this invention.

The invention claimed is:

1. A branching unit for an optical transmission system, said optical transmission system having an electrical conduction path along with optical fibers, the branching unit having a first branch and a second branch, each connected to a main branch, said system including:
    first directional current flow means operable independently of current flow in said second branch to allow electrical current to flow substantially in one direction only along the first branch,
    second directional current flow means operable independently of current flow in said first branch to allow electrical current to flow substantially in one direction only along the second branch,
    whereby said first and second directional current flow means can substantially prevent electrical current flow from the first branch to the second branch and from the second branch to the first branch and can also prevent a simultaneous conduction of current between the first branch and the main branch and between the second branch and the main branch.

2. A branching unit according to claim 1 wherein the first branch is connectable to an electrical conducting path of a first optical transmission cable at a first branch connection point.

3. A branching unit according to claim 2 wherein the second branch is connectable to a second optical transmission cable at a second branch connection point.

4. A branching unit according to claim 3 wherein the first directional current flow means is located between the main branch and the first branch connection point and the second directional current flow means is located between the main branch and the second branch connection point.

5. A branching unit according to claim 4 wherein a first earth connection point is provided to the first branch between the first branch connection point and the first directional current flow means.

6. A branching unit according to claim 5 wherein the first earth connection point is connected to the first branch via a directional current flow means, directed so as to allow a current flow between the first branch and earth substantially in one direction only.

7. A branching unit according to claim 4 wherein a second earth connection point is provided to the second branch between the second branch connection point and the second directional current flow means.

8. A branching unit according to claim 7 wherein the second earth connection point is connected to the second branch via a directional current flow means, directed so as to allow a current flow between the second branch and earth substantially in one direction only.

9. A branching unit according to claim 1 including detection means for detecting an electrical fault in the branching unit.

10. A branching unit according to claim 1 including detection means for detecting an electrical fault in a cable attached to the branching unit.

11. A branching unit according to claim 1 which is a submarine branching unit.

12. A branching unit according to claim 1 wherein one or more of the directional current flow means is a solid state device.

13. A branching unit according claim 1 wherein one or more of the directional current flow means is a semiconducting diode.

14. A branching unit according to claim 1 wherein one or more of the directional current flow means has a reverse bias breakdown voltage of more than 1 kv.

15. A branching unit according to claim 1 wherein electrical power is suppliable to the main branch from the first branch or from the second branch.

16. An optical transmission system having an electrical conduction path along with optical fibers, said system further having a branching unit having a first branch and a second branch, each connected to a main branch, said system including:
   first directional current flow means operable independently of current flow in said second branch to allow electrical current to flow substantially in one direction only along the first branch,
   second directional current flow means operable independently of current flow in said first branch to allow electrical current to flow substantially in one direction only along the second branch,
   whereby said first and second directional current flow means can substantially prevent electrical current flow from the first branch to the second branch and from the second branch to the first branch and can also prevent a simultaneous conduction of current between the first branch and the main branch and between the second branch and the main branch;
   and further including a first optical transmission cable connected to the first branch, a second optical transmission cable connected to the second branch and a main optical transmission cable connected to the main branch, and power feed apparatus connectable to electrical conduction paths of the cables for providing electrical power onto the cables.

17. An optical transmission system according to claim 16 wherein the power feed apparatus connectable to the second optical transmission cable is switchable from one voltage to another in response to the occurrence of a fault in the first optical transmission cable, in order to supply the main cable with electrical power.

18. A method of operation of a branching unit in an optical transmission system of the type having an electrical conduction path along with optical fibers, the branching unit having a first branch and a second branch, each connected to a main branch, said branching unit including first directional current flow means operable independently of current flow in said second branch to allow electrical current to flow substantially in one direction only along the first branch, and second directional current flow means operable independently of current flow in said first branch to allow electrical current to flow substantially in one direction only along the second branch, whereby, in use, electrical current flow from the first branch to the second branch and from the second branch to the first branch is substantially prevented and a simultaneous conduction of current between the first branch and the main branch and between the second branch and the main branch is prevented; said method comprising,
   in a normal mode of operation, holding an electrical conduction path of the first branch at a first voltage, with a current flowing through the first directional current flow means due to a potential difference between the first branch and the main branch, and
   in a fault mode of operation, applying a second voltage to an electrical conduction path of the second branch so that there is a potential difference between the second branch and the main branch, the potential difference having a direction such that a current flows through the second directional current flow means; and due to the potential applied to the second branch, the potential difference across the first directional current flow means is in the opposite direction to that required for substantial current to flow through the first directional current flow means so that substantially no current flows between the main branch and the first branch, whereby in the fault mode substantially all of the current in the main branch flows along the second branch and not along the first branch.

19. A method according to claim 18 wherein the method includes the step of detecting an occurrence of an electrical fault in the first or second branch.

20. A method according to claim 19 wherein the method further includes the step of removing an electrical fault from the first branch and subsequently applying a voltage to the first branch such that an electrical current flows between the first branch and an earth connection at the branching unit, thereby powering electrical devices connected to the first branch.

21. A method according to claim 18 wherein optical data signals are routed through optical fibers of the branching unit such that the data signals travel along the first branch or the second branch, depending on which is powered.

22. A method according to claim 18 wherein, in the normal mode of operation, the electrical conduction path of the second branch is held at a voltage such that an electrical current flows between the second branch and an earth connection at the branching unit, thereby powering electrical devices connected to the second branch.

* * * * *